US011788567B2

(12) United States Patent
Derelöv (10) Patent No.: US 11,788,567 B2
(45) Date of Patent: Oct. 17, 2023

(54) SET OF PANELS WITH A MECHANICAL LOCKING DEVICE

(71) Applicant: Välinge Innovation AB, Viken (SE)

(72) Inventor: Peter Derelöv, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/822,199

(22) Filed: Aug. 25, 2022

(65) Prior Publication Data

US 2023/0145010 A1 May 11, 2023

Related U.S. Application Data

(63) Continuation of application No. 17/126,518, filed on Dec. 18, 2020, now Pat. No. 11,441,590.

(30) Foreign Application Priority Data

Dec. 19, 2019 (SE) .................... 1951508-9

(51) Int. Cl.
*F16B 12/20* (2006.01)
*F16B 5/00* (2006.01)
(Continued)

(52) U.S. Cl.
CPC ............ *F16B 12/20* (2013.01); *A47B 47/042* (2013.01); *F16B 5/0012* (2013.01);
(Continued)

(58) Field of Classification Search
CPC ............ A47B 47/0066; A47B 47/0075; A47B 47/025; A47B 47/042; A47B 2088/902;
(Continued)

(56) References Cited

U.S. PATENT DOCUMENTS 6,413,007 B1 7/2002 Lambright
6,438,919 B1 * 8/2002 Knauseder ............. E04F 15/04
52/592.4

(Continued)

FOREIGN PATENT DOCUMENTS

DE          3244398 A1    6/1984
WO    2017/052456 A1    3/2017
(Continued)

OTHER PUBLICATIONS

U.S. Appl. No. 15/956,949, Peter Derelöv, filed Apr. 19, 2018, (Cited herein as US Patent Application Publication No. 2019/0323535 A1 of Oct. 24, 2019).
(Continued)

*Primary Examiner* — Josh Skroupa
(74) *Attorney, Agent, or Firm* — Boone IP Law (57) ABSTRACT

A set of panels including a first panel with a first main plane and a second panel with a second main plane with a second main surface. The first and second main planes are essentially perpendicular in a locked position. The first and the second panel include a locking device for locking a first edge of the first panel to a second edge of the second panel. The locking device includes an edge groove wherein the edge groove includes a tongue, which is configured to cooperate with a tongue groove of the first panel, in a locked position, for locking the first and the second edges in a first direction which is perpendicular to the first main plane. A first groove surface of the edge groove cooperate with second main surface to lock the first and second panel in a second direction which is perpendicular to the second main plane.

21 Claims, 8 Drawing Sheets

(51) Int. Cl.
*F16B 12/46* (2006.01)
*F16B 12/12* (2006.01)
*F16B 12/04* (2006.01)
*A47B 47/04* (2006.01)

(52) U.S. Cl.
CPC ............ *F16B 12/125* (2013.01); *F16B 12/46* (2013.01); *F16B 2012/043* (2013.01); *Y10T 403/602* (2015.01); *Y10T 403/7075* (2015.01)

(58) Field of Classification Search
CPC .... A47B 2230/0029; A47B 2230/0037; A47B 2230/0081; F16B 5/0012; F16B 5/0016; F16B 5/0044; F16B 5/0052; F16B 5/002; F16B 12/125; F16B 12/20; F16B 12/24; F16B 12/26; F16B 12/46; F16B 2012/043; F16B 2012/046; F16B 2012/103; F16B 2012/466; Y10T 403/602; Y10T 403/7075; Y10T 403/7092
See application file for complete search history.

(56) References Cited

U.S. PATENT DOCUMENTS

| | | |
|---|---|---|
| 7,621,092 B2 | 11/2009 | Groeke et al. |
| 8,042,311 B2 | 10/2011 | Pervan et al. |
| 8,887,468 B2 | 11/2014 | Hakansson et al. |
| 9,375,085 B2 | 6/2016 | Derelv |
| 9,538,842 B2 | 1/2017 | Hkansson et al. |
| 9,655,442 B2 | 5/2017 | Boo et al. |
| 9,714,672 B2 | 7/2017 | Derelv |
| 9,723,923 B2 | 8/2017 | Derelv |
| 9,726,210 B2 | 8/2017 | Derelv et al. |
| 9,945,121 B2 | 4/2018 | Derelv |
| 10,034,541 B2 | 7/2018 | Boo et al. |
| 10,202,996 B2 | 2/2019 | Hkansson et al. |
| 10,415,613 B2 | 9/2019 | Boo |
| 10,448,739 B2 | 10/2019 | Derelov et al. |
| 10,451,097 B2 | 10/2019 | Brnnstrm et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelv et al. |
| 10,669,716 B2 | 6/2020 | Derelv |
| 10,670,064 B2 | 6/2020 | Derelv |
| 10,724,564 B2 | 7/2020 | Derelv |
| 10,731,688 B2 | 8/2020 | Brnnstrm et al. |
| 10,736,416 B2 | 8/2020 | Derelv et al. |
| 10,830,266 B2 | 11/2020 | Fridlund |
| 10,830,268 B2 | 11/2020 | Boo |
| 10,871,179 B2 | 12/2020 | Hkansson et al. |
| 10,876,562 B2 | 12/2020 | Pervan |
| 10,876,563 B2 | 12/2020 | Derelv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelov |
| 11,137,007 B2 | 10/2021 | Fridlund |
| 11,204,051 B2 | 12/2021 | Brnnstrm et al. |
| 11,246,415 B2 | 2/2022 | Derelov et al. |
| 11,272,783 B2 | 3/2022 | Derelv |
| 11,326,636 B2 | 5/2022 | Pervan |
| 11,371,542 B2 | 6/2022 | Derelv |
| 11,428,253 B2 | 8/2022 | Hkansson et al. |
| 11,445,820 B2 | 9/2022 | Derelov et al. |
| 11,448,249 B2 | 9/2022 | Derelv |
| 11,466,717 B2 | 10/2022 | Bruno et al. |
| 11,506,235 B2 | 11/2022 | Fransson et al. |
| 11,536,307 B2 | 12/2022 | Derelv |
| 2008/0295438 A1* | 12/2008 | Knauseder ............ F16B 5/0012 403/336 |
| 2012/0279161 A1 | 11/2012 | Hakansson et al. |
| 2015/0035422 A1 | 2/2015 | Hakansson et al. |
| 2015/0078807 A1 | 3/2015 | Brnnstrm et al. |
| 2015/0078819 A1 | 3/2015 | Derelv et al. |
| 2015/0196118 A1 | 7/2015 | Derelv |
| 2015/0198191 A1 | 7/2015 | Boo |
| 2016/0007751 A1 | 1/2016 | Derelv |
| 2016/0174704 A1 | 6/2016 | Boo et al. |
| 2016/0270531 A1 | 9/2016 | Derelv |
| 2017/0079433 A1 | 3/2017 | Derelov et al. |
| 2017/0089379 A1 | 3/2017 | Pervan |
| 2017/0097033 A1 | 4/2017 | Hakansson et al. |
| 2017/0159291 A1 | 6/2017 | Derelv |
| 2017/0208938 A1 | 7/2017 | Derelv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelv |
| 2017/0360193 A1 | 12/2017 | Boo et al. |
| 2018/0080488 A1 | 3/2018 | Derelv |
| 2018/0087552 A1 | 3/2018 | Derelv et al. |
| 2018/0112695 A1 | 4/2018 | Boo et al. |
| 2018/0119717 A1 | 5/2018 | Derelv |
| 2018/0202160 A1 | 7/2018 | Derelv |
| 2018/0328396 A1 | 11/2018 | Fransson et al. |
| 2019/0113061 A1 | 4/2019 | Hakansson et al. |
| 2019/0166989 A1 | 6/2019 | Boo et al. |
| 2019/0191870 A1 | 6/2019 | Derelv |
| 2019/0195256 A1 | 6/2019 | Derelv |
| 2019/0289999 A1 | 9/2019 | Derelv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelv |
| 2019/0323535 A1 | 10/2019 | Derelv |
| 2020/0003242 A1 | 1/2020 | Brnnstrm et al. |
| 2020/0055126 A1 | 2/2020 | Fridlund |
| 2020/0069048 A1 | 3/2020 | Derelv et al. |
| 2020/0069049 A1 | 3/2020 | Derelv et al. |
| 2020/0102978 A1 | 4/2020 | Fridlund |
| 2020/0121076 A1 | 4/2020 | Derelov et al. |
| 2020/0214447 A1 | 7/2020 | Derelov et al. |
| 2020/0300284 A1 | 9/2020 | Pervan |
| 2020/0337455 A1 | 10/2020 | Boo et al. |
| 2020/0340513 A1 | 10/2020 | Derelv |
| 2021/0079650 A1 | 3/2021 | Derelov |
| 2021/0148392 A1 | 5/2021 | Brnnstrm et al. |
| 2021/0180630 A1 | 6/2021 | Bruno et al. |
| 2021/0207635 A1 | 7/2021 | Hkansson et al. |
| 2021/0222716 A1 | 7/2021 | Derelv et al. |
| 2021/0262507 A1 | 8/2021 | Svensson et al. |
| 2021/0262508 A1 | 8/2021 | Svensson et al. |
| 2021/0276108 A1 | 9/2021 | Derelv et al. |
| 2021/0285480 A1 | 9/2021 | Derelv et al. |
| 2021/0381251 A1 | 12/2021 | Svensson |
| 2022/0018373 A1 | 1/2022 | Boo |
| 2022/0049735 A1 | 2/2022 | Meijer |
| 2022/0186761 A1 | 6/2022 | Derelv et al. |
| 2022/0213912 A1 | 7/2022 | Boo |
| 2022/0228615 A1 | 7/2022 | Sostar |
| 2022/0243751 A1 | 8/2022 | Brännström et al. |
| 2022/0252097 A1 | 8/2022 | Rydsjöet al. |
| 2022/0354248 A1 | 11/2022 | Derelov |

FOREIGN PATENT DOCUMENTS

WO 2017/138874 A1 8/2017
WO 2021/126048 A1 6/2021

OTHER PUBLICATIONS

U.S. Appl. No. 16/663,603, Magnus Fridlund, filed Oct. 25, 2019, (Cited herein as US Patent Application Publication No. 2020/0055126 A1 of Feb. 20, 2020).
U.S. Appl. No. 16/953,608, Peter Derelöv, Hans Brännström and Agne Pålsson, filed Nov. 20, 2020 (Cited herein as US Patent Application Publication No. 2021/0285480 A1 of Sep. 16, 2021).
U.S. Appl. No. 17/398,416, Thomas Meijer, filed Aug. 10, 2021 (Cited herein as US Patent Application Publication No. 2022/0049735 A1 of Feb. 17, 2022).

(56) References Cited

OTHER PUBLICATIONS

U.S. Appl. No. 17/514,055, Marko Sostar, filed Oct. 29, 2021 (Cited herein as US Patent Application Publication No. 2022/0228615 A1 of Jul. 21, 2022).
U.S. Appl. No. 17/524,293, Hans Brännström, Agne Pålsson and Peter Derelöv, filed Nov. 11, 2021 (Cited herein as US Patent Application Publication No. 2022/0243751 A1 of Aug. 4, 2022).
U.S. Appl. No. 17/546,356, Peter Derelöv and Hans Brännström, filed Dec. 9, 2021 (Cited herein as US Patent Application Publication No. 2022/0186761 A1 of Jun. 16, 2022).
U.S. Appl. No. 17/556,146, Christian Boo, filed Dec. 20, 2021 (Cited herein as US Patent Application Publication No. 2022/0213912 A1 of Jul. 7, 2022).
U.S. Appl. No. 17/665,160, Oscar Rydsjö, Marko Sostar and Patrik Carlsson, filed Feb. 4, 2022 (Cited herein as US Patent Application Publication No. 2022/0252097 A1 of Aug. 11, 2022).
U.S. Appl. No. 17/717,359, Darko Pervan, filed Apr. 11, 2022 (Cited herein as US Patent Application Publication No. 2022/0299057 A1 of Sep. 22, 2022).
U.S. Appl. No. 17/869,911, Niclas Håkansson and Darko Pervan, filed Jul. 21, 2022.
U.S. Appl. No. 17/870,215, Peter Derelöv and Christian Boo, filed Jul. 21, 2019 (Cited herein as US Patent Application Publication No. 2022/0354248 A1 of Nov. 10, 2022).
U.S. Appl. No. 18/058,037, Peter Derelöv, filed Nov. 22, 2022.
International Search Report and Written Opinion dated Jan. 11, 2021 in PCT/SE2020/051239, ISA/SE, Patent-och registreringsverket, Stockholm, SE, 14 pages.

* cited by examiner

SET OF PANELS WITH A MECHANICAL LOCKING DEVICE

CROSS REFERENCE TO RELATED APPLICATIONS

The present application is a continuation of U.S. application Ser. No. 17/126,518, filed on Dec. 18, 2020, which claims the benefit of Swedish Application No. 1951508-9, filed on Dec. 19, 2019. The entire contents of each of U.S. application Ser. No. 17/126,518 and Swedish Application No. 1951508-9 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

BACKGROUND

A furniture product provided with a mechanical locking device is known in the art, as evidenced by WO2017/052456. The furniture comprises a first panel connected mainly perpendicular to a second panel by mechanical locking device. The mechanical locking device can be disassembled by an angling motion.

SUMMARY

It is an object of certain aspects of the present invention to provide an improvement over the above described techniques and known art; particularly to facilitate assembling of panels configured to be assembled without the need of using any tools. A further object of at least certain aspects of the present invention is to assemble panels which may show a tighter and more aesthetic connection between a frame panel and a back piece of a furniture, such as a bookshelf, a cupboard, a wardrobe, a kitchen fixture, a drawer, or a box for storing or transportation.

A further object of at least certain aspects of the present invention may be to manufacture the back piece comprising a mechanical locking device with fewer production steps and lower cost.

At least some of these and other objects and advantages that will be apparent from the description have been achieved by a set of panels comprising a first panel with a first main plane with a first main surface and a second panel with a second main plane with a second main surface, wherein the first main plane is essentially perpendicular to the second main plane in a locked position, wherein the second panel comprises a third main surface at a first distance from the second main surface wherein the first and the second panel comprises a locking device for locking a first edge of the first panel to a second edge of the second panel, wherein the locking device comprises an edge groove at the first edge of the first panel, said edge groove comprise a first groove surface and a opposite second groove surface and a first bottom surface wherein the locking device comprises a tongue groove at the second main surface of the second panel, said panel comprises a first edge surface which is facing the first bottom surface in a locked position, the second panel further comprises a second edge surface extending between the tongue groove and the first edge surface, wherein the edge groove comprises a tongue, which is configured to cooperate with the tongue groove in a locked position, for locking the first and the second edges in a first direction which is perpendicular to the first main plane, wherein the first groove surface cooperate with second main surface, at a first contact area in a locked position and the second groove surface cooperate with the third main surface, at a second contact area, to lock the first and second panel in a second direction which is perpendicular to the second main plane wherein the first contact area is positioned, in a locked position, at a second distance from the second contact area, characterized in that the second distance is greater than the first distance, and that the edge groove at the intersection of the first and third main surface has an open space.

According to an aspect the second distance may be the closest distance in a perpendicular direction to the first main plane between the first and second contact area.

According to an aspect the tongue may protrude from the first groove surface.

According to an aspect the tongue may be a flexible tongue.

According to an aspect the tongue may be arranged in an insertion groove.

According to an aspect the first and second contact area may be positioned at a third distance in a perpendicular direction to the second main plane, wherein the first distance may be greater than the third distance.

According to an aspect the part of the second panel, inserted in edge groove, in locked position, may be bent in a direction, towards the first groove surface.

According to an aspect the locking device may comprise a first space in locked position, between the second edge surface and the first groove surface.

According to an aspect the first groove surface comprises an upper part positioned above the tongue and a lower part positioned below the tongue wherein the lower part is displaced relative the upper part such that a first space may be obtained in the locked position between the second lower part and the second edge surface.

According to an aspect the edge groove may comprise a second bottom surface at a greater depth than the first bottom surface.

According to an aspect the locking device may comprise a second space in locked position, between the first edge surface and second bottom surface.

According to an aspect the first and second contact area may be positioned at a third distance, and the second groove surface and the first bottom surface may be positioned at a fourth distance in a perpendicular direction to the second main plane.

According to an aspect the fourth distance may be within the range of about 0.1×third distance to 0.9×third distance, or about 0.25×third distance to 0.75×third distance, or more preferably about 0.5×third distance.

According to an aspect a first angle between the second groove surface and the second main plane may be within the range of about 1-30°, or in the range of 2-20° or more preferably about 5-10°.

According to an aspect a second angle between the first main surface and the first groove surface may be within the range of about 70-89°, or about 88-80°, or more preferably about 85° such that a first space may be obtained in a locked position between the second edge surface and a lower part of the first groove surface.

According to an aspect the first and/or the second panel may comprise a wood fiber based material, such as one or more of HDF, MDF, plywood, solid wood or particleboard, or a reinforced plastic board or a wood fiber composite board.

According to an aspect the first and/or second panel may comprise a decorative layer.

According to an aspect the edge groove may extend along essentially the entire length of the first edge.

According to an aspect the second panel may comprise said tongue groove in at least two of four edges.

According to an aspect the locking device may be configured to be unlocked by an angling motion of the panel relative the adjacent panel, such that a third angle γ between the first and second main plane is increasing.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which

FIG. 4A-6B shows a cross sectional view of a set according to an assembled state in various embodiments of the invention.

FIG. 7B-8 shows a cross sectional view of a set in an assembled state in different embodiments of the invention.

DETAILED DESCRIPTION

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims.

The different aspects, alternatives and embodiments of the invention disclosed herein can be combined with one or more of the other aspects, alternatives and embodiments described herein. Two or more aspects can be combined.

As used herein, the term "about" means±10% of the noted value. By way of example only, an angle of "about 45°" could include from 40.5° up to and including 49.5°.

Figure 1A:
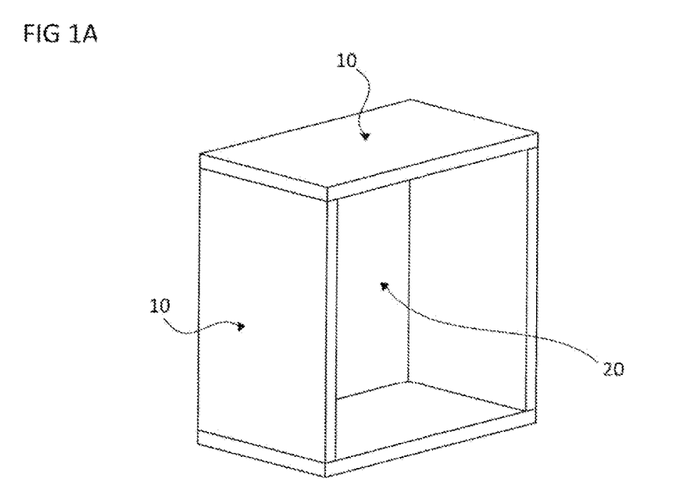
FIG. 1A shows a 3D-view of a set comprising four of the first panel, forming a cabinet frame and one of the second panel in an assembled state of an embodiment of the invention.
Figure 1B:
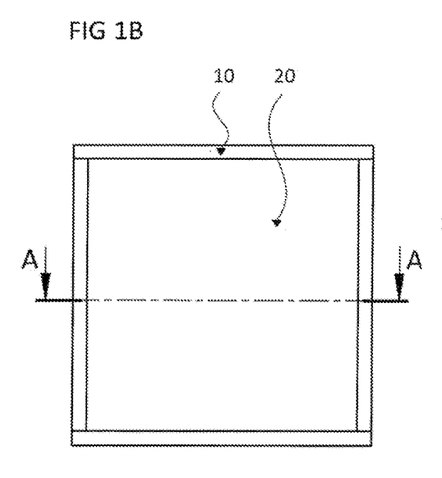
FIG. 1B shows a front view of a set comprising four of the first panel, one of the second panel in an assembled state of an embodiment of the invention.
Figure 1C:
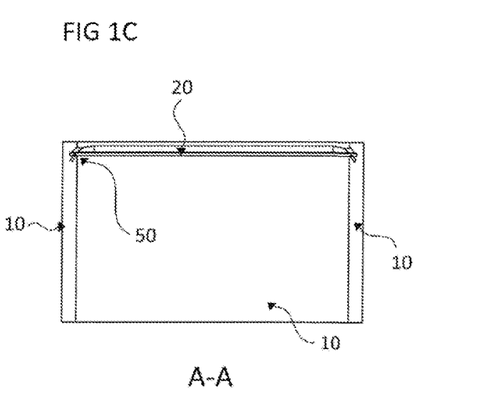
FIG. 1C shows a cross-section view, in an assembled state of an embodiment of the invention.

An embodiment of the invention is shown in FIG. 1A-1C as an assembled furniture including a set of panels comprising a first panel 10 with a first main plane 11 with a first main surface 12 and a second panel 20 with a second main plane 21 with a second main surface 22, wherein the first main plane 11 may be essentially perpendicular to the second main plane 21 in a locked position. The second panel 20 comprises a third main surface 25 at a first distance A from the second main surface 22, wherein the first and the second panel comprises a locking device 50 for locking a first edge of the first panel 10 to a second edge of the second panel 20.

FIGS. 2A, 3A, 4A-8 show enlargements of embodiments of the locking device 50 comprising an edge groove 30 at the first edge of the first panel 10, said edge groove comprise a first groove surface 31 and a opposite second groove surface 32 and a first bottom surface 33.

The locking device 50 comprises a tongue groove 26 at the second main surface 22 of the second panel 20, said panel comprises a first edge surface 23 which is facing the first bottom surface 33 in a locked position, the second panel further comprises a second edge surface 24 extending between the tongue groove 26 and the first edge surface 23, wherein the edge groove 30 comprises a tongue 40, which is configured to cooperate with the tongue groove 26 in a locked position, for locking the first and the second edges in a first direction D1 which is perpendicular to the first main plane 11.

The first groove surface 31 cooperate with second main surface 22, at a first contact area 31' in a locked position and the second groove surface 32 cooperate with the third main surface 25, at a second contact area 32', to lock the first and second panel in a second direction D2 which may be perpendicular to the second main plane 21. The first contact area 31' is positioned, in a locked position, at a second distance H from the second contact area 32'.

Figure 2A:
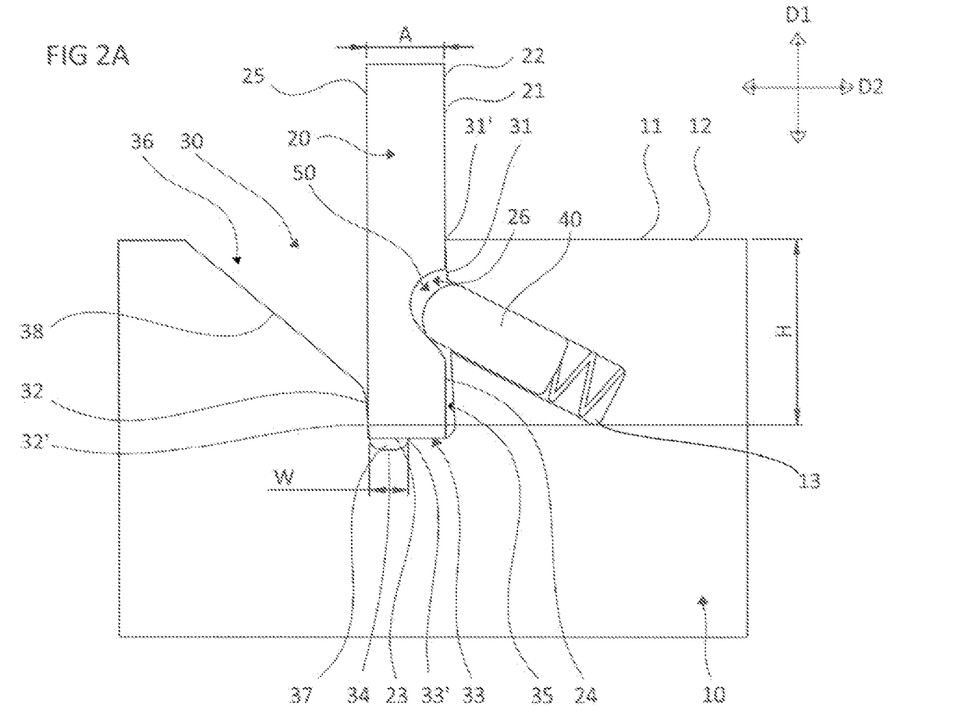
FIG. 2A shows a cross sectional view of a set in an assembled state according to an embodiment of the invention.
Figure 2B:
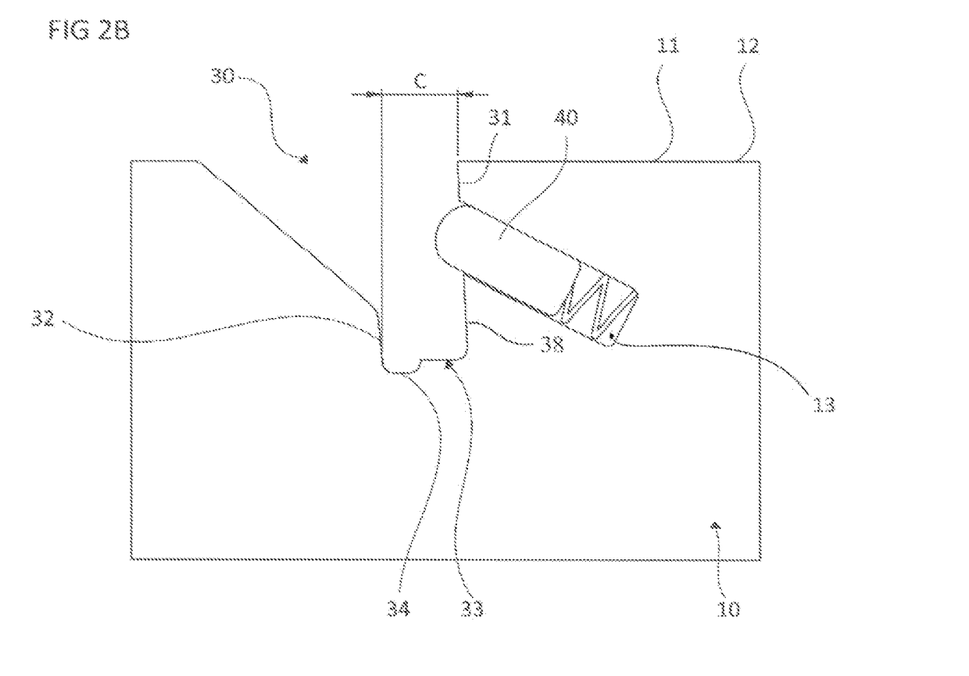
FIG. 2B shows a cross sectional view of a first panel according to an embodiment of the invention.

FIG. 2B discloses an enlargement of a part of an embodiment of the first panel 10 in unassembled state.

Figure 3A:
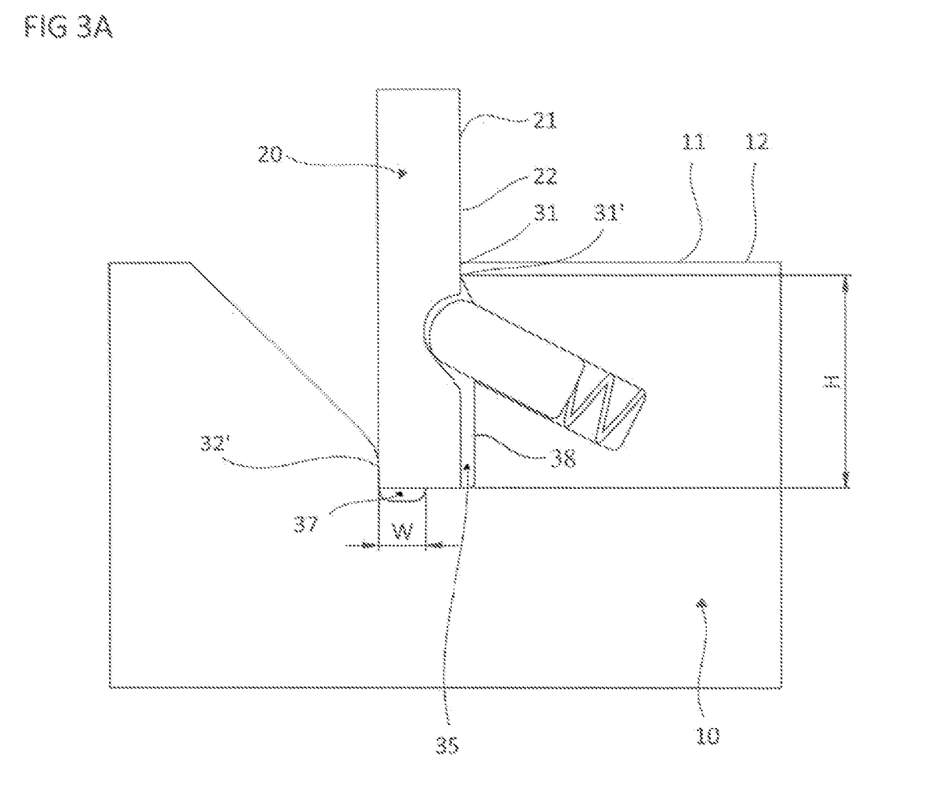
FIG. 3A shows a cross sectional view of a set in an assembled state according to an embodiment of the invention.

FIG. 3A discloses an enlargement of an embodiment of the locking device 50 wherein an upper part of the first groove surface 31 positioned above the tongue 40 and a second lower part 38 of the first groove surface 31 positioned below the tongue 40 may be parallel and displaced such that a first space 35 may be obtained in the locked position at the second lower part 38.

Embodiments of the locking device 50 comprises an embodiment of the edge groove 30 comprising an open space 36 at the intersection of the first and third main surface 12, 25.

Figure 3B:
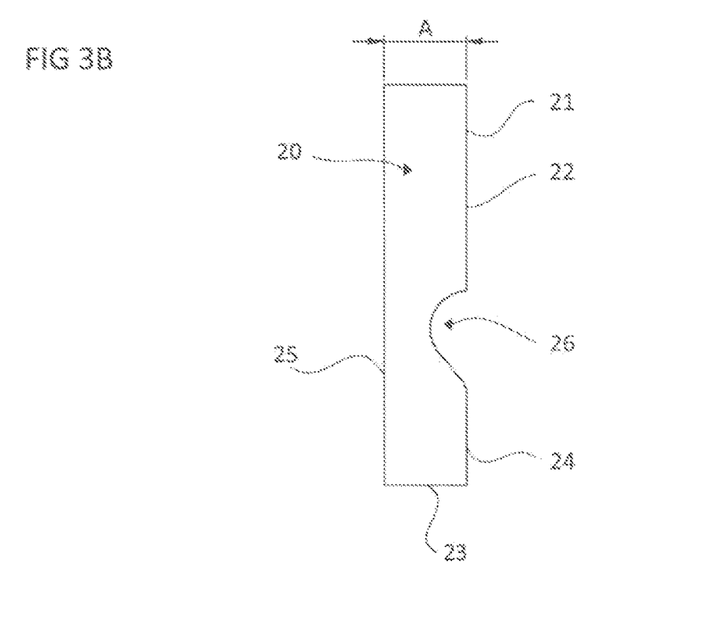
FIG. 3B shows a cross sectional view of a second panel according to an embodiment of the invention.

FIG. 3B discloses an enlargement of a part of an embodiment of the second panel 20 in an unassembled state of the invention. In this embodiment the second panel comprises no guide chamfers.

Figure 4A:
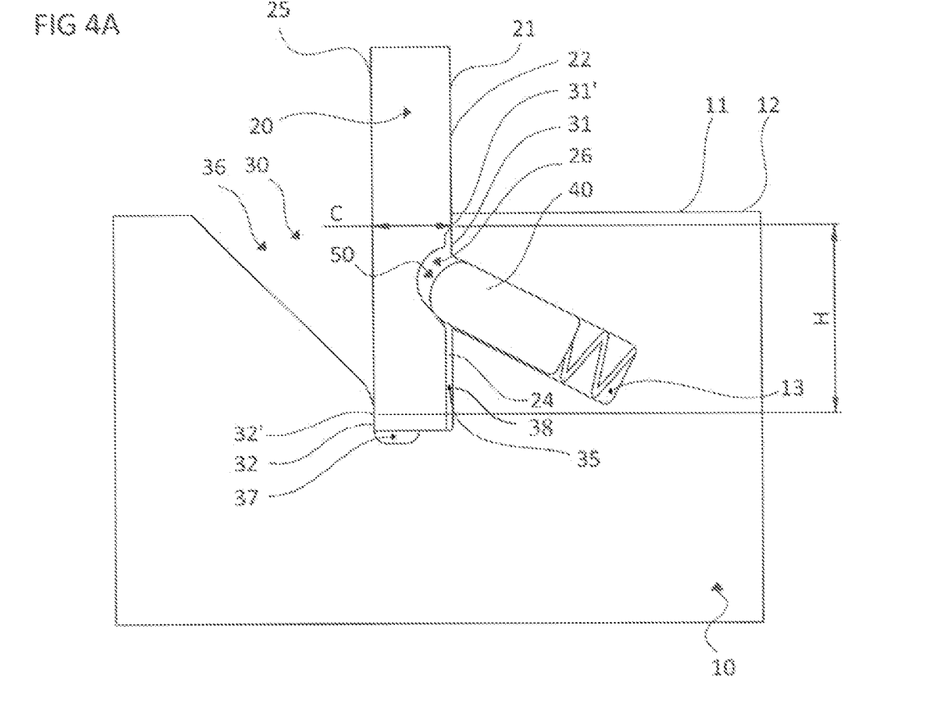

FIG. 4A discloses an enlargement of an embodiment of the locking device 50 wherein the second edge surface 24 is displaced from the second main surface 22 such that a first space 35 may be obtained in the locked position at the second edge surface 24.

According to an embodiment of the invention the second distance H may be greater than the first distance A.

According to an embodiment of the invention the second distance H may be the closest distance in a perpendicular direction to the first main plane 11 between the first and second contact area 31', 32'.

According an embodiment of the invention the first groove surface 31 may comprise a protruding tongue 40.

Figure 4B:
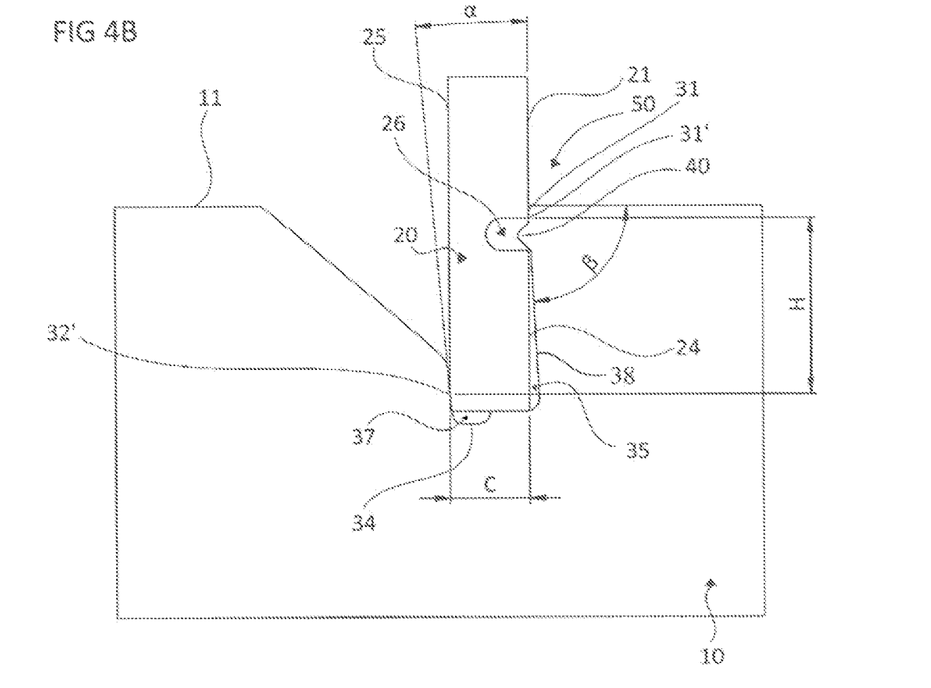

FIG. 4B discloses an enlargement of an embodiment of the locking device 50 wherein the tongue 40 may be formed from the first panel 10, preferably by milling.

According to an embodiment of the invention the locking device 50 may comprise a flexible tongue 40.

The locking device 50 may comprise a tongue 40, arranged in an insertion groove 13. The tongue may comprise a polymer material which may be reinforced with filler, such as glass fiber.

According to an embodiment the first and second contact area 31',32' may be positioned at a third distance C in a perpendicular direction to the second main plane 21, the first distance A may be greater than the third distance C. For example, the first distance A may be at least 3% greater than the third distance C, at least 5% greater than the third distance C, at least 10% greater than the third distance C, or at least 15% greater than the third distance C.

Figure 8:
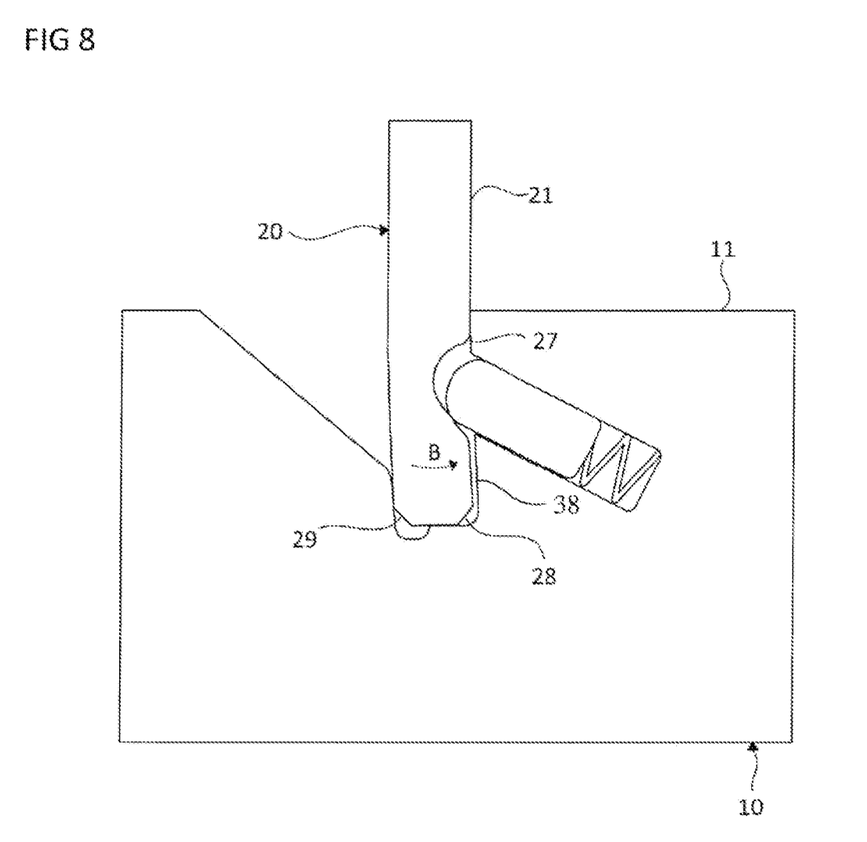

FIG. 8 discloses a set according an embodiment of the invention. A portion of the second panel 20, inserted in edge groove 30, in locked position, may be bent in a direction B, towards the first groove surface 31, preferably towards the second lower part 38 of the first groove surface 31.

The thickness of the second panel 20 may vary, due to production tolerances in the panel production process. The bending B of the second panel 20 may compensate for thickness variations. A thicker panel causes a bigger degree of bending, consequently a thinner panel causes less degree of bending. The above described bending enables the exclusion of a production step where the first distance A of the second panel 20 is set by a calibration cut, such a milling with a profiling tool.

The bending B may result in a compressive force between the second main surface 22 of the second panel 20 and the first contact area 31' of the edge groove 30 of the first panel 10. The compressive force may create a tight and more aesthetic connection between the first and second panel.

According to an embodiment of the invention the locking device 50 may comprise a first space 35 in locked position, between the second edge surface 24 and the first groove surface 31.

The first space 35 may facilitate the bending B.

The first space 35 may facilitate angling of the second panel 20 during disassembly of a set.

Figure 5A:
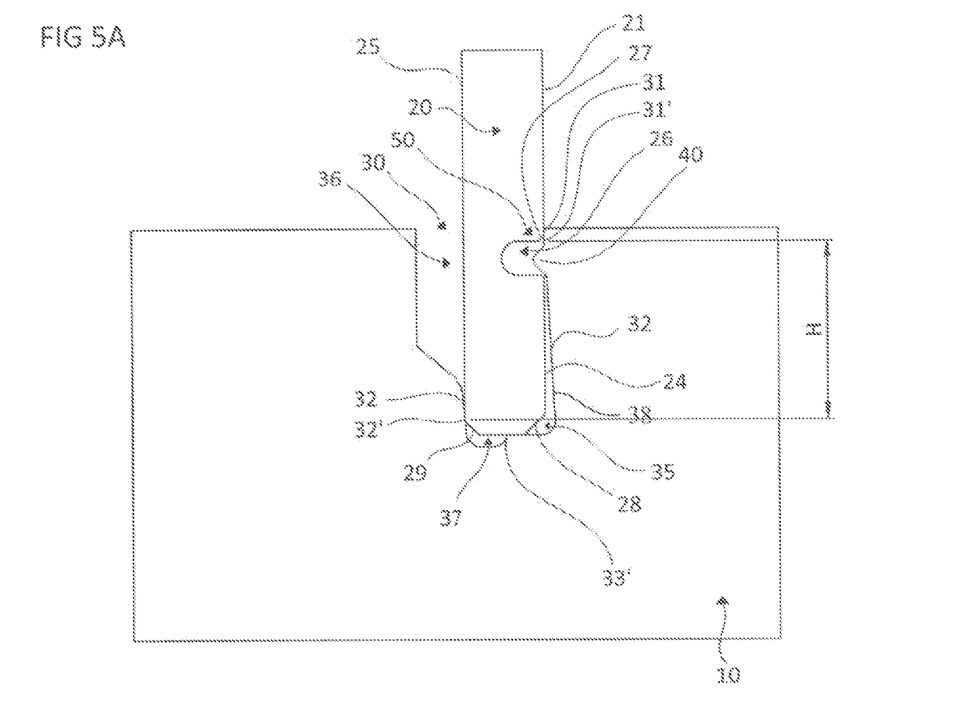

FIG. 5A disclose an enlargement of an embodiment of the locking device 50 wherein the second panel 20 may comprise a guide chamfer 28.

According to an embodiment of the invention the tongue groove 26 may comprise a guide chamfer 27 to improve the installation sequence of the first panel 10 and second panel 20.

According to an embodiment of the invention the second panel 20 may comprise a guide chamfer 29 and/or 28 to further improve the installation of the first panel 10 and second panel 20.

The above described guide chamfers may be an improvement in at least one installation sequence where the second panel 20 is displaced parallel to the second main plane 21 towards the first panel 10 in a perpendicular direction to the first main plane 11 where the second panel 20 is inserted into the edge groove 30 and locked together by the locking device 50.

Figure 5B:
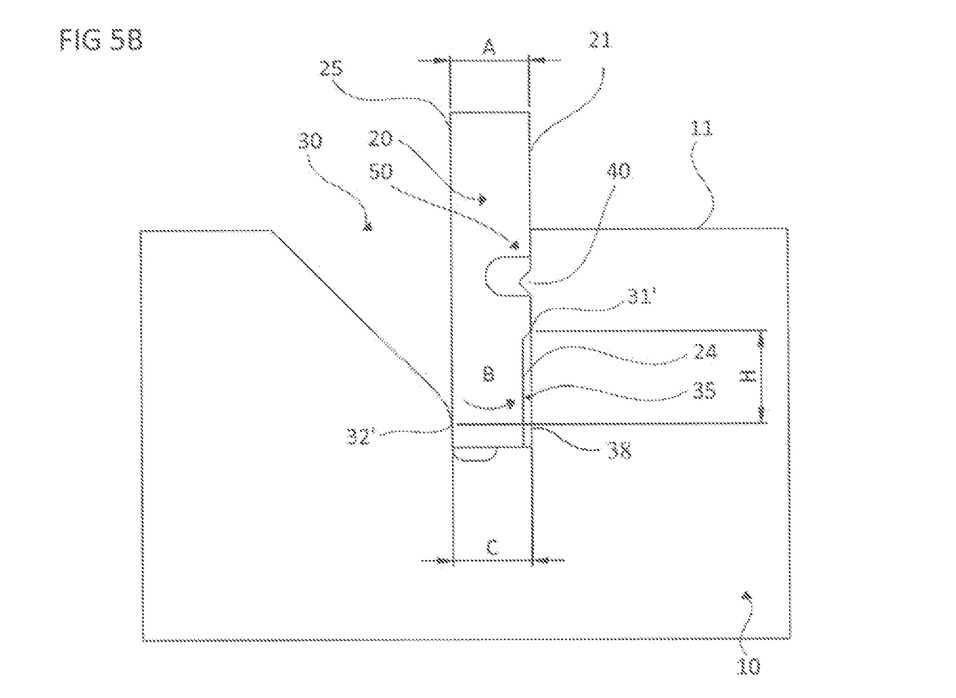

FIG. 5B disclose an enlargement of an embodiment of the locking device 50 wherein the first contact area 31' may be positioned below the tongue 40.

Figure 6A:
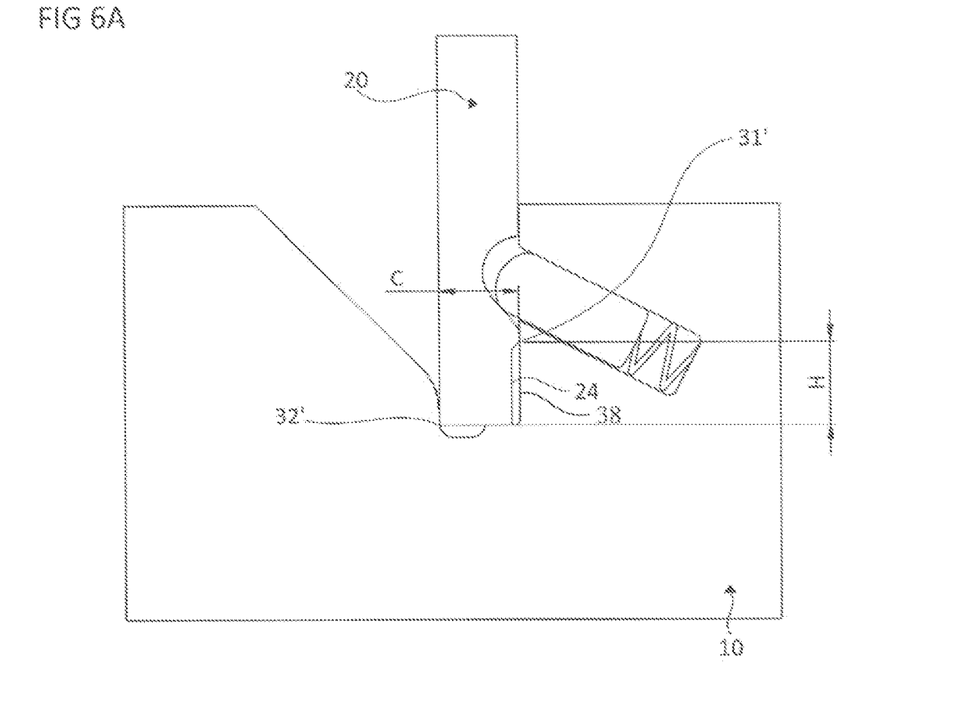

FIG. 6A disclose an enlargement of an embodiment of the locking device 50 wherein the first contact area 31' may be positioned below the flexible tongue 40.

According to an embodiment of the invention the edge groove 30 may comprise a second bottom surface 34 at a greater depth than the first bottom surface 33.

According an embodiment of the invention the locking device 50 comprises a second space 37 in locked position, between the first edge surface 23 and second bottom surface 34. The second space 37 may facilitate an easier disassembly of a set.

Figure 6B:
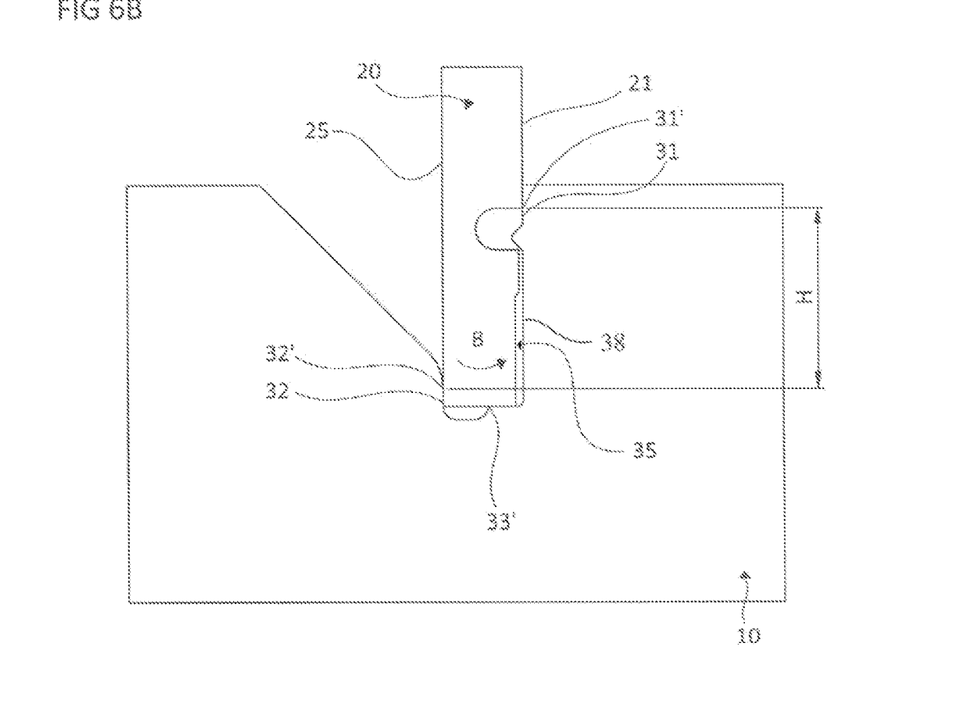

FIG. 6B disclose an enlargement of an embodiment of the locking device 50 wherein a lower part of the first space 35 has a greater width than an upper part of the first space 35.

According to an embodiment of the invention the first and second contact areas 31',32' may be positioned at a third distance C, and the second groove surface 32 and the first bottom surface 33 are positioned at a fourth distance W in a perpendicular direction to the second main plane 21.

According to an embodiment of the invention the fourth distance W may be within the range of about 0.1×C to 0.9×C, or about 0.25×C to 0.75×C, or more preferably about 0.5×C.

According to an embodiment of the invention a first angle α between the second groove surface 32 and the second main plane 21, in locked position, may be within the range of about 1-30°, or in the range of 2-20° or more preferably about 5-10°.

According to an embodiment of the invention a second angle β between the first main surface 12 and the first groove surface 31 may be within the range of about 70-89°, or about 88-80°, or more preferably about 85° such that a first space (35) may be obtained in a locked position between the second edge surface (24) and a lower part (38) of the first groove surface (31).

According to an embodiment of the invention the first and/or the second panel may comprise a wood fiber based material, such as one or more of HDF, MDF, plywood, solid wood or particleboard, or a reinforced plastic board or a wood fiber composite board.

According to an embodiment of the invention the first and/or second panel may comprise a decorative layer.

According to an embodiment of the invention the edge groove 30 may extend along essentially the entire length of the first edge.

According to an embodiment of the invention the second panel 20 may comprise said tongue groove 26 in at least two of four edges. For example, the second panel 20 could include the tongue groove on two opposite edges, and be free of the tongue groove on the remaining two opposite edges.

Figure 7A:
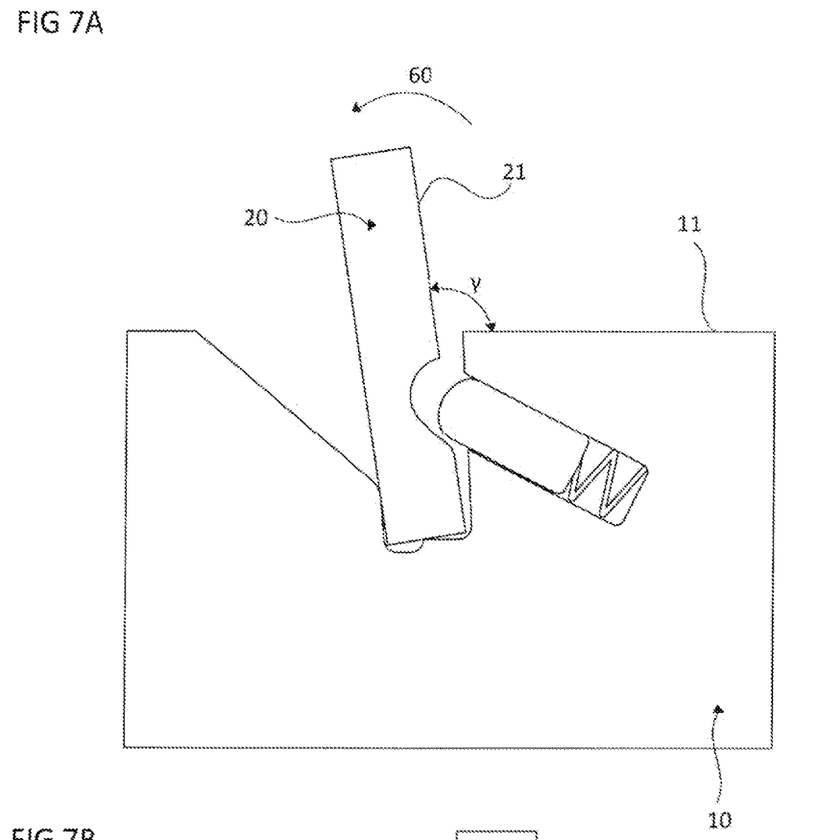
FIG. 7A shows a cross sectional view of a set according to an unassembled state in an embodiment of the invention.

FIG. 7A discloses an enlargement of an embodiment of the locking device 50 wherein the locking device may be configured to be unlocked by an angling motion 60 of the panel 20 relative the adjacent panel 10, such that a third angle γ between the first and second main plane 11,21 is increasing.

Figure 7B:
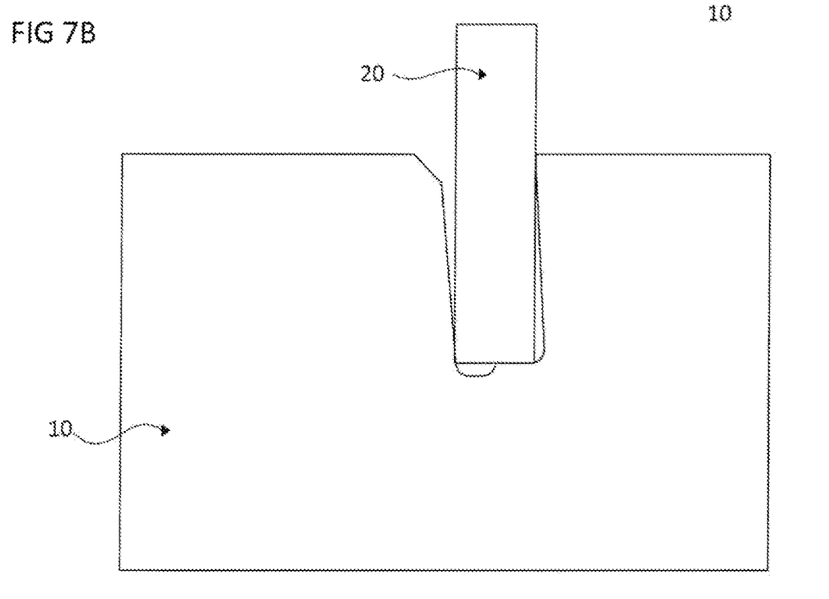

FIG. 7B disclose an enlargement of an embodiment of the locking device 50 wherein the first and second panel 10,20 may be locked by friction.

According to an embodiment of the invention an assembled furniture may include four first panels 10 and one second panel 20. In an embodiment, all four first panels 10 include the same type of locking device, to enable locking to all four edges of the second panel 20. In an embodiment, two of the four first panels include the same type of locking device, with a tongue configured to lock with a tongue groove on the second panel, and the remaining two first panels may not include a locking device or may include a locking device that is locked by friction, such as shown in FIG. 7B.

The different aspects, embodiments and alternatives described above could be combined with one or more of the other described aspects, embodiments and alternatives.

The invention claimed is:

1. A set of panels comprising a first panel with a first main plane with a first main surface and a second panel with a second main plane with a second main surface, wherein the first main plane is essentially perpendicular to the second main plane in a locked position, wherein the second panel comprises a third main surface at a first distance (A) from the second main surface,
   wherein the first panel and the second panel comprise a locking device for locking a first edge of the first panel to a second edge of the second panel,
   wherein the locking device comprises an edge groove at the first edge of the first panel, said edge groove comprises a first groove surface and an opposite second groove surface and a first bottom surface,
   wherein the locking device comprises a tongue groove at the second main surface of the second panel,
   wherein the second panel comprises a first edge surface which is facing the first bottom surface in a locked position, the second panel further comprises a second edge surface extending between the tongue groove and the first edge surface,
   wherein the edge groove comprises a tongue, which is configured to cooperate with the tongue groove in a locked position, for locking the first and the second edges in a first direction which is perpendicular to the first main plane,
   wherein the first groove surface cooperates with the second main surface, at a first contact area in a locked position and the second groove surface cooperates with the third main surface, at a second contact area, to lock the first and second panel in a second direction which is perpendicular to the second main plane,
   wherein the first contact area is positioned, in a locked position, at a second distance (H) from the second contact area,
   wherein the second distance (H) is greater than the first distance (A),
   wherein the edge groove at the intersection of the first and third main surfaces has an open space,
   wherein the tongue groove comprises a tongue groove surface, wherein the tongue groove surface comprises a guide chamfer, such that the guide chamfer intersects the second main surface, wherein the guide chamfer provides a guide surface at a smaller angle relative to the second main plane compared to the tongue groove surface.

2. The set of panels as claimed in claim 1, wherein the second distance (H) is the closest distance in a perpendicular direction to the first main plane between the first and second contact area.

3. The set of panels as claimed in claim 1, wherein the tongue protrudes from the first groove surface.

4. The set of panels as claimed in claim 1, wherein the tongue is a flexible tongue.

5. The set of panels as claimed in claim 1, wherein the tongue is arranged in an insertion groove.

6. The set of panels as claimed in claim 1, wherein the first and second contact area are positioned at a third distance (C) in a perpendicular direction to the second main plane, wherein the first distance (A) is greater than the third distance (C).

7. The set of panels as claimed in claim 1, wherein a part of the second panel, inserted in the edge groove, in locked position, is bent in a direction towards the first groove surface.

8. The set of panels as claimed in claim 1, wherein the locking device comprises a first space in a locked position, between the second edge surface and first groove surface.

9. The set of panels as claimed in claim 1, wherein the edge groove comprises a second bottom surface at a greater depth than the first bottom surface.

10. The set of panels as claimed in claim 9, wherein the locking device comprises a second space in locked position, between the first edge surface and second bottom surface.

11. The set of panels as claimed in claim 10, wherein the first and second contact areas are positioned at a third distance (C) in a perpendicular direction to the second main plane, and the second groove surface and the first bottom surface are positioned at a fourth distance (W) in a perpendicular direction to the second main plane.

12. The set of panels as claimed in claim 11, wherein the fourth distance (W) is within the range of about 0.1×C to 0.9×C.

13. The set of panels as claimed in claim 1, wherein a first angle (α) between the second groove surface and the second main plane, in locked position is within the range of about 1-30°.

14. The set of panels as claimed in claim 1, wherein a second angle (β) between the first main surface and the first groove surface is within the range of about 70-89°, such that a first space is obtained in a locked position between the second edge surface and a lower part of the first groove surface.

15. The set of panels as claimed in claim 1, wherein the first and/or the second panel comprises a wood fiber based material.

16. The set of panels as claimed in claim 1, wherein the first and/or second panel comprises a decorative layer.

17. The set of panels as claimed in claim 1, wherein the edge groove extends along essentially the entire length of the first edge.

18. The set of panels as claimed in claim 1, wherein the second panel comprises said tongue groove in at least 2 of 4 edges.

19. The set of panels as claimed in claim 1, wherein the locking device is configured to be unlocked by an angling motion of the panel relative the adjacent panel, such that a third angle (γ) between the first and second main plane is increasing.

20. The set of panels as claimed in claim 1, wherein the first groove surface comprises an upper part positioned above the tongue and a second lower part positioned below the tongue wherein the lower part is displaced relative the upper part such that a first space may be obtained in the locked position between second edge surface and the second lower part.

21. The set of panels as claimed in claim 1, wherein the guide chamfer is at an end of the tongue groove closest to the first main surface of the first panel.

* * * * *